C. Hellen,
Egg-Cup,
N°. 68,984. Patented Sept. 17, 1867.
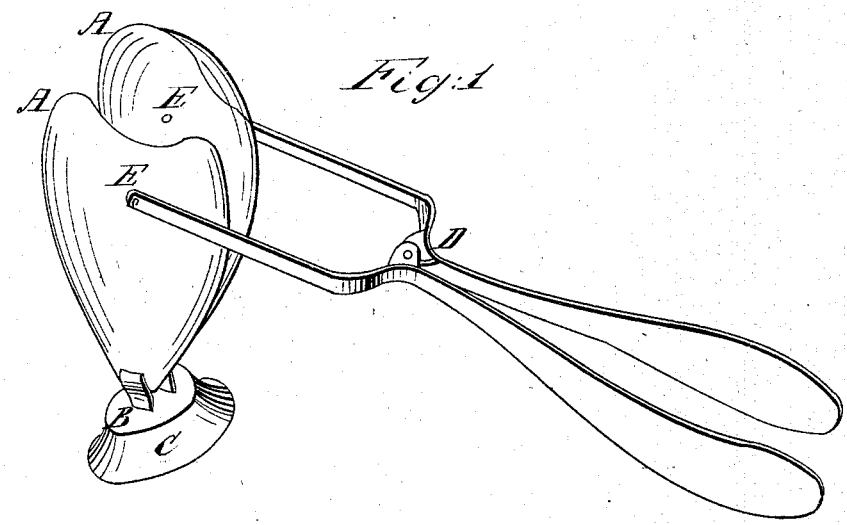
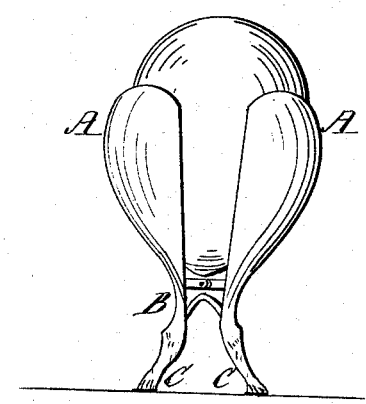
Witnesses
J. Franklin Reigart
W. F. Hellen
Inventor
Clifton Hellen

United States Patent Office.

CLIFTON HELLEN, OF WASHINGTON, DISTRICT OF COLUMBIA.

Letters Patent No. 68,984, dated September 17, 1867.

---

IMPROVED EGG-CUP AND TONGS.

---

The Schedule referred to in these Letters Patent and making part of the same.

---

TO ALL WHOM IT MAY CONCERN:

Be it known that I, CLIFTON HELLEN, of the city of Washington, District of Columbia, have invented a useful and improved Egg-Cup; and I do hereby declare the following to be an exact description thereof, reference being had to the accompanying drawings, and to the letters of reference marked thereon, making a part of this specification, in which—

Figure 1 represents the adjustable cup and tongs.

Figure 2 shows the cup separate from the tongs, with the stand or bottom of the cup divided, so as to answer the purpose of feet.

The nature of my invention is an adjustable metallic cup, shaped similar to an egg, so as to fit and hold a boiled egg on the table, the cup having a solid or open stand to rest on the table as an ornamental base or feet; the cup being pivoted to the ends of a tongs or jointed handle for convenience and use to avoid handling the hot egg with the fingers.

A A represent the egg-cup, formed and shaped to suit the shape of an egg, made of metal, and in two parts, so as to open and close on to the egg by means of a spring-joint, B, attached to a stand or ornamental base, C. The base may be (as at fig. 1) solid, or divided to answer as feet, (as shown at fig. 2.) The cup A is attached to the ends of a tongs or jointed handle, D, on pivots E, so as to hold the egg upright or rest it on a table, and is thus prevented from upsetting. The pivots E are intended to be screws or movable pins, so as to remove the tongs whenever required to use the adjustable cup without the tongs.

What I claim as my invention, and desire to secure by Letters Patent, is—

The adjustable metallic egg-cup A, with its spring-joint B and base C, combined with the tongs D, as herein described and for the purposes set forth.

CLIFTON HELLEN.

Witnesses:
J. FRANKLIN REIGART,
EDM. F. BROWN.